United States Patent
Zaniboni et al.

(10) Patent No.: US 12,110,195 B2
(45) Date of Patent: Oct. 8, 2024

(54) TRANSPORT SYSTEM

(71) Applicant: I.M.A. Industria Macchine Automatiche S.p.A., Ozzano dell'Emilia (IT)

(72) Inventors: Carlo Zaniboni, Ozzano dell'Emilia (IT); Corrado Minghelli, Ozzano dell'Emilia (IT)

(73) Assignee: I.M.A. INDUSTRIA MACCHINE AUTOMATICHE S.P.A., Ozzano Dell'emilia (IT)

( * ) Notice: Subject to any disclaimer, the term of this patent is extended or adjusted under 35 U.S.C. 154(b) by 110 days.

(21) Appl. No.: 18/014,064

(22) PCT Filed: Jun. 30, 2021

(86) PCT No.: PCT/IT2021/050204
§ 371 (c)(1),
(2) Date: Dec. 30, 2022

(87) PCT Pub. No.: WO2022/003745
PCT Pub. Date: Jan. 6, 2022

(65) Prior Publication Data
US 2023/0264904 A1 Aug. 24, 2023

(30) Foreign Application Priority Data
Jul. 1, 2020 (IT) .......... 102020000015829

(51) Int. Cl.
*B65G 54/02* (2006.01)
*B65G 21/22* (2006.01)

(52) U.S. Cl.
CPC .................. *B65G 54/02* (2013.01)

(58) Field of Classification Search
CPC ........ B65G 54/02; B65G 21/22; B65G 17/20; B65G 35/08; B65G 2203/0208; B65G 47/841; B65G 17/32
(Continued)

(56) References Cited

U.S. PATENT DOCUMENTS 9,403,611 B2 * 8/2016 Sacchetti ............. B65G 47/842
9,834,392 B2 * 12/2017 Raffaini ............... B65G 47/082
(Continued)

FOREIGN PATENT DOCUMENTS

DE        84 09 357 U1      7/1984
JP        2001171512 A   *  6/2001
(Continued)

OTHER PUBLICATIONS

International Search Report issued Oct. 1, 2021 in PCT/IT2021/050204.

*Primary Examiner* — Gene O Crawford
*Assistant Examiner* — Muhammad Awais
(74) *Attorney, Agent, or Firm* — Panitch Schwarze Belisario & Nadel LLP (57) ABSTRACT

A transport system for transporting products, in particular products to be assembled, includes a stationary sliding track defining a continuous sliding path free of interruptions, a mobile unit which can be moved on the sliding track in a direction of advance, and motor means to move the mobile unit on the sliding track. The transport system also includes at least one rolling guide and at least one rolling unit configured to cooperate, according to a sliding relation, with the rolling guide.

17 Claims, 4 Drawing Sheets

(58) Field of Classification Search
USPC .......................................................... 198/619
See application file for complete search history.

(56) References Cited

U.S. PATENT DOCUMENTS

| | | | | |
|---|---|---|---|---|
| 2010/0140052 A1* | 6/2010 | Martini | ................ | B65G 47/082 |
| | | | | 198/419.2 |
| 2013/0192956 A1* | 8/2013 | Lahogue | ................ | B65G 17/20 |
| | | | | 198/478.1 |
| 2015/0274342 A1* | 10/2015 | Zuccotti | .................... | B65B 7/28 |
| | | | | 53/133.2 |
| 2016/0176659 A1* | 6/2016 | Aumann | ................ | B65G 54/02 |
| | | | | 198/619 |
| 2019/0177019 A1* | 6/2019 | Trebbi | .................... | B65B 43/50 |
| 2019/0218038 A1* | 7/2019 | Monti | .................. | B65G 35/063 |
| 2019/0389675 A1* | 12/2019 | Kleinikkink | ....... | H02K 11/0141 |

FOREIGN PATENT DOCUMENTS

| | | | | |
|---|---|---|---|---|
| WO | 2018047059 A1 | 3/2018 | | |
| WO | WO-2019150299 A1 * | 8/2019 | ....... | A61F 13/15747 |

\* cited by examiner fig. 4 fig. 5

TRANSPORT SYSTEM

CROSS-REFERENCE TO RELATED APPLICATIONS

This application is a Section 371 of International Application No. PCT/IT2021/050204, filed Jun. 30, 2021, which was published in the English language on Jan. 6, 2022, under International Publication No. WO 2022/003745 A1, which claims priority under 35 U.S.C. § 119(b) to Italian Application No. 102020000015829, filed Jul. 1, 2020, the disclosures of each of which are incorporated by reference herein.

FIELD OF THE INVENTION

The present invention concerns a transport system for discrete articles, in particular but not only, products to be assembled. Preferably, the transport system according to the present invention provides to use linear motors with an electromagnetic drive, as well as in indexed belt/chain transport systems, or moved "step-wise".

BACKGROUND OF THE INVENTION

In the industrial automation sector, automated transport systems able to transport loose products, or discrete articles, are well known, typically between different processing stations provided in an industrial processing line.

Such transport systems comprise a conveyor member, which defines a path of advance for the products.

In some solutions known in the state of the art, the conveyor members are configured as belts, chains or other similar transport components, closed in a loop on at least one pair of drawing rollers, in which at least one roller is motorized to determine, with its rotation, the advance of the conveyor members on which the products rest.

In other solutions known in the state of the art, the conveyor members are configured as a plurality of transport sliders, each supporting one or more products, and sliding on a fixed linear guide. The guide comprises rectilinear and curved segments, which develop in such a way as to allow the sliders carrying the products to follow the expected path of advance.

One example of a transport system of this type, included in the solutions known in the state of the art, is described in the international patent application published under the publication number n. WO 2018/047059 A1.

One technology that is widely used in this type of solutions known in the state of the art is that of electromagnetically driven linear motors. This technology provides that each transport slider comprises a permanent magnet cooperating with a plurality of electromagnets that are embedded in the fixed part, in a position such that they face the permanent magnets, with the interposition of an air gap between them. The permanent magnets, in cooperation with the electromagnets, allow to drive the transport sliders by selectively activating the electromagnets when it is desired to drive a particular transport slider, which moves thanks to the electromagnetic field generated, according to methods known in the state of the art.

Transport systems that use electromagnetically driven linear motors have long been used in many industrial sectors, such as for example in the packaging of products in primary or secondary packaging. These linear motors perform very well, in fact, since they allow to have high accelerations and to independently control the movement of the transport sliders.

One disadvantage of traditional transport systems is the presence of significant design constraints, in particular to allow the correct advance of the transport sliders in the closed paths formed by rectilinear segments and curved segments. In fact, the geometry of the transport sliders strictly depends on the characteristics of the curved segments, in particular on their radius of curvature. As will be easily understood, in the passage from the rectilinear segments to the curved segments, the slider must be able to follow the path without interruption.

In particular, for transport systems with electromagnetically driven linear motors, the permanent magnet housed on the slider is arranged locally tangent to the linear guide, and consequently the air gap assumes different values in different points of the magnet. In other words, in this condition the distance between the permanent magnet and the electromagnet is much greater in correspondence with the two opposite lateral ends of the permanent magnet with respect to its center.

This means that the design of the geometries of the transport sliders and the curved segments of the guide is a very delicate step because it is necessary to guarantee the correct functioning of the transport system, preventing the slider from losing contact with the guide on which it slides and, in the case of a drive with linear motors, preventing the electromagnetic field that determines the advance of the transport sliders from undergoing weakening or interruptions, even if the latter are only localized and temporally limited.

Therefore, the transition of the transport sliders from the rectilinear to the curved segments is a very delicate step. In fact, in the transition between these segments, the transport slider tends to deviate from the guide due to the fact that the instantaneous variation of the direction of the speed vector in this transition entails a discontinuity of the acceleration, which causes the transport slider to tend to detach from the linear guide.

Another disadvantage of known transport systems is that the geometric constraints on the transport sliders cause each of them to have a reduced load capacity, as they are able to support only a few products at a time. It is evident that this is very disadvantageous because it constitutes a constraint on the design of the size of the sliders.

There is therefore a need to perfect a transport system which can overcome at least one of the disadvantages of the state of the art.

In particular, one purpose of the present invention is to provide a transport system that is reliable during use to guarantee the correct functioning of the system, in particular while the transport sliders make the transition from the rectilinear segments to the curved segments.

Another purpose of the present invention is to provide a transport system in which the transport sliders each have a greater load capacity than sliders known in the state of the art, so as to be able to move a greater number of products organized on the same slider.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, there is provided a transport system for transporting products, in particular loose products to be assembled, which overcomes the limits of the state of the art and eliminates the defects present therein.

One advantage of the transport system according to the present invention is that it eliminates the design constraints which in the state of the art significantly limit the load capacity of the mobile units because of the maximum sizes allowed. This is possible thanks to the presence of the variable cam profile offset, which allows the mobile unit to be disposed, with respect to the sliding track, in particular in the transition zones between the rectilinear portion and the curved portion, so as not to become detached from the sliding track in the event it has overall sizes greater than those of the mobile units known in the state of the art. One example of such sizes is the center distance between the rolling elements of the same rolling unit, which in the mobile units of the transport system according to the present invention is much greater than, in particular even three or four times greater than, the center distance that characterizes the mobile units known in the state of the art.

ILLUSTRATION OF THE DRAWINGS

These and other aspects, characteristics and advantages of the present invention will become apparent from the following description of one embodiment, given as a non-restrictive example with reference to the attached drawings wherein.

To facilitate comprehension, the same reference numbers have been used, where possible, to identify identical common elements in the drawings. It is understood that elements and characteristics of one embodiment can conveniently be combined with, or incorporated into, other embodiments without further clarifications.

DESCRIPTION OF SOME EMBODIMENTS

We will now refer in detail to the possible embodiments of the invention, of which one or more examples are shown in the attached drawings by way of a non-limiting illustration. The phraseology and terminology used here is also for the purposes of providing non-limiting examples.

Figure 1:
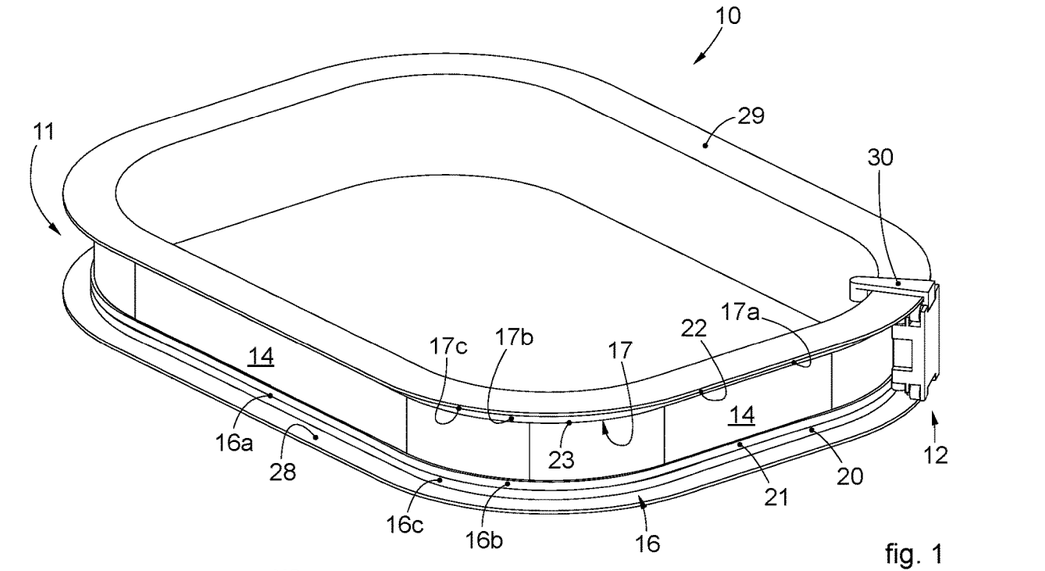
FIG. 1 is a schematic and simplified perspective view of a transport system in accordance with the teachings of the present invention.

With reference to FIG. 1, a transport system for transporting products is described, which is indicated as a whole with reference number 10.

The products, which are not depicted in the attached drawings, can for example be products to be assembled, within the context of an automated production line, particularly in the packaging sector. It is quite clear that the transport system in accordance with the present invention is suitable to transport many types of different products, without the type, shape and sizes of the products affecting the scope of protection of the present invention.

The transport system 10 comprises a stationary sliding track 11 extended along a continuous sliding path free of interruptions.

In the example shown, visible in FIG. 1, the sliding track 11 can be inscribed within a rectangle and therefore comprises four rectilinear portions and four curved portions reciprocally connected according to an alternating sequence.

It should be noted that the sliding path can be closed, as in the case shown in FIG. 1 and described here, or open.

Figure 2:
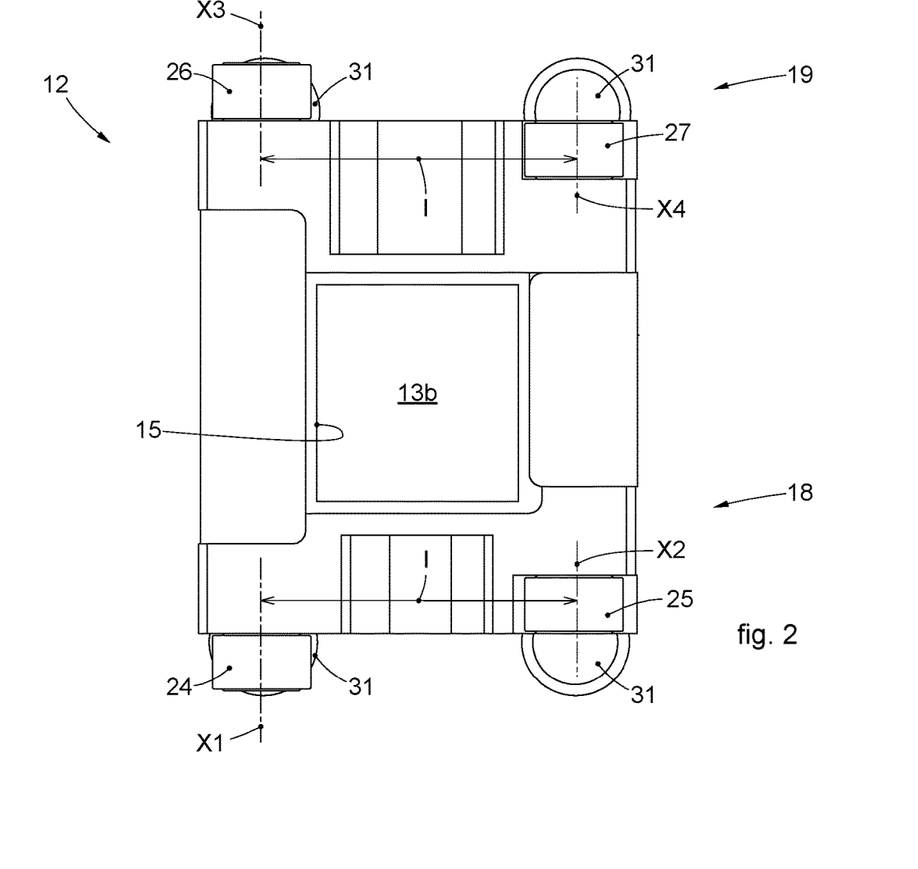
FIG. 2 is a schematic and simplified front view of a mobile unit comprised in the transport system of FIG. 1.
Figures 3, 3A, 3B:
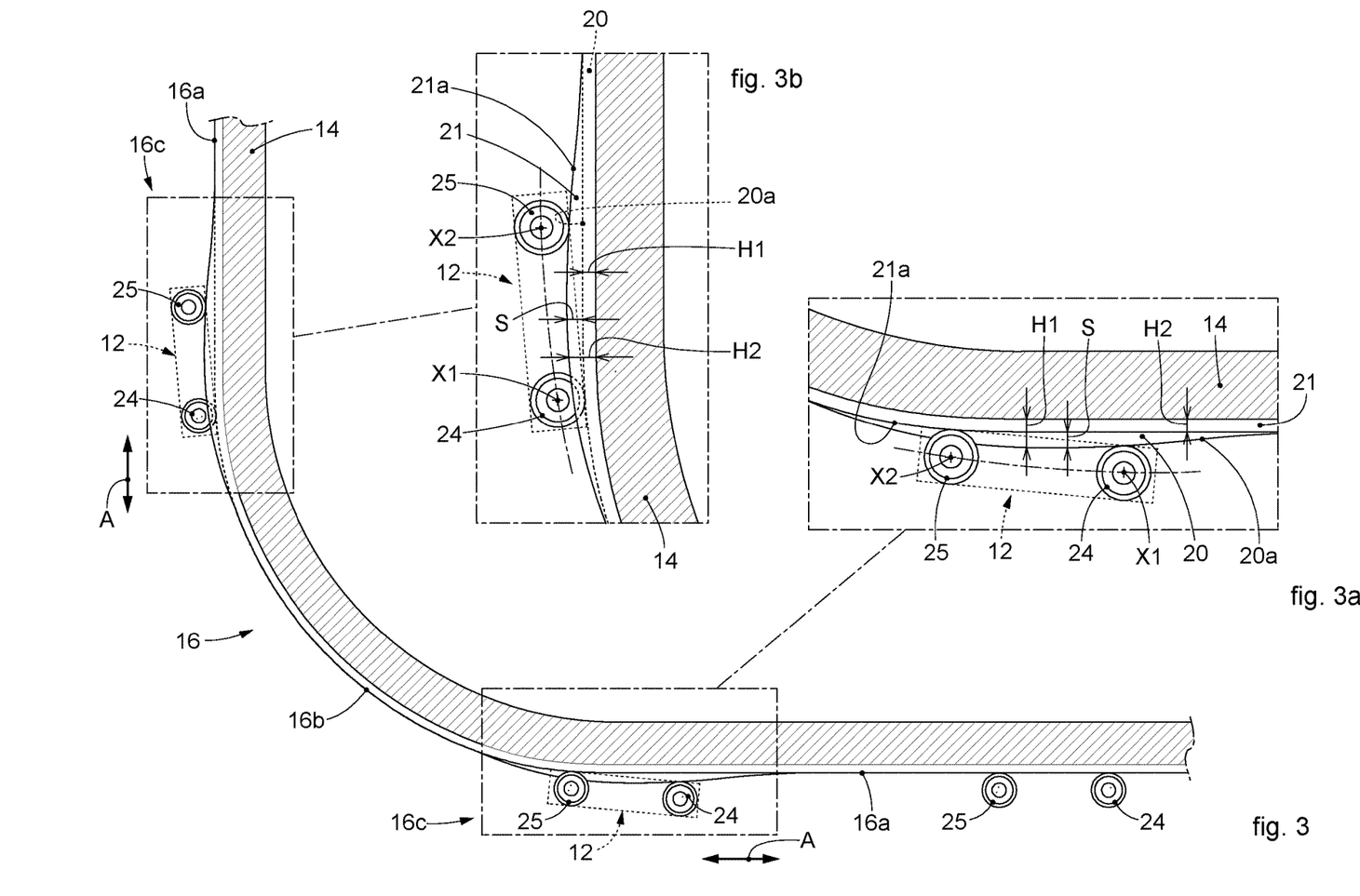
FIG. 3 is a schematic top plan view, enlarged and not to scale, of a portion of a sliding track comprised in the transport system of FIG. 1, in which there are represented different rolling units comprised in the mobile unit of FIG. 2.
FIGS. 3a and 3b are enlarged details of FIG. 3.
Figure 6:
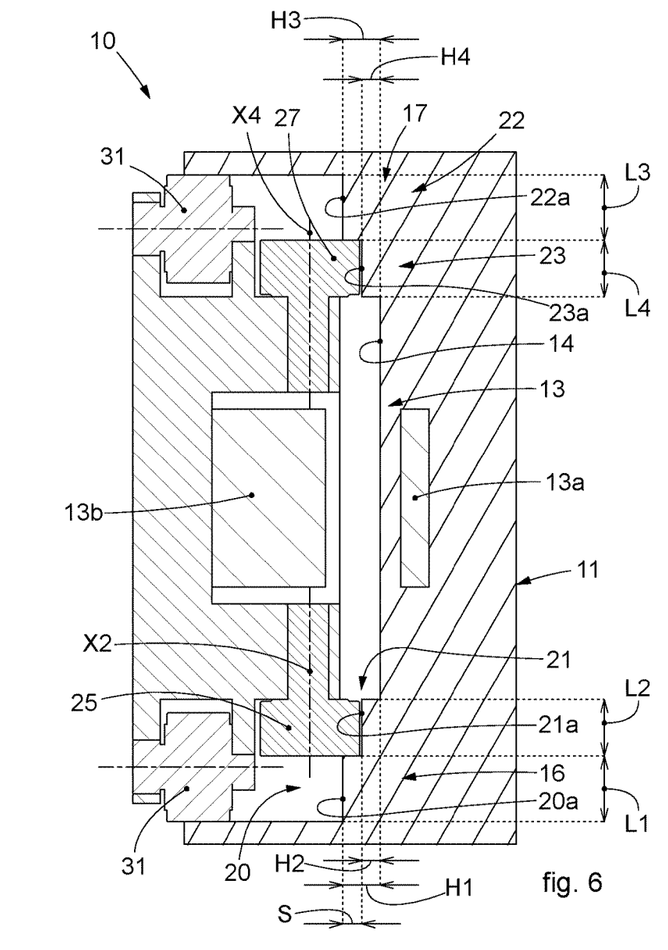
FIGS. 6 and 7 are schematic section views of the mobile unit of FIG. 2, in which a portion of the sliding track comprised in the transport system of the present invention is also visible, also in section.
Figure 7:
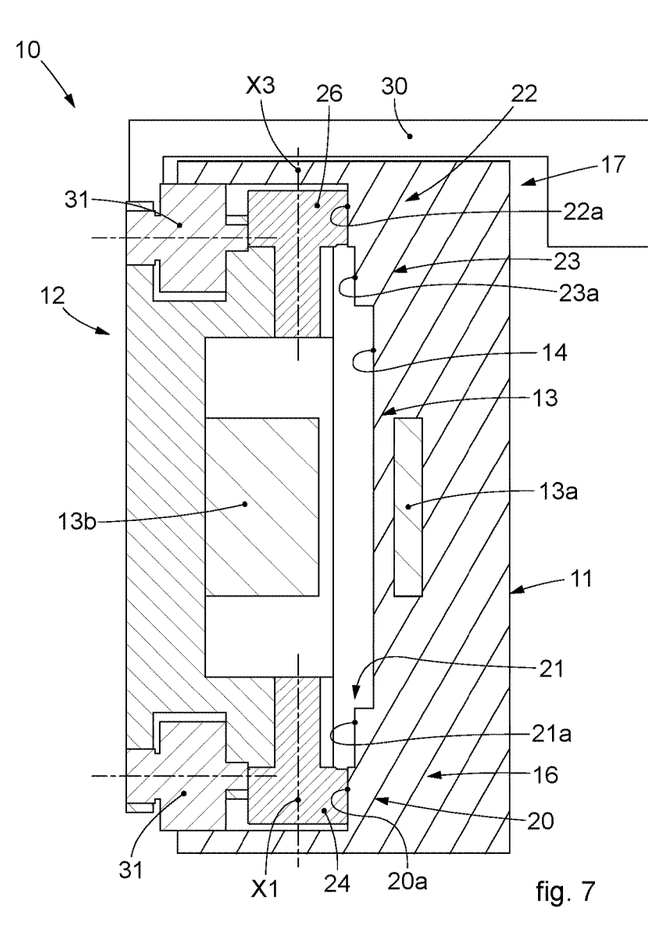

The transport system 10 comprises a mobile unit or slider, indicated with reference number 12, which can be moved along the sliding track 11, and better visible in FIG. 2 and in the section views of FIGS. 6 and 7. The mobile slider 12 moves on the sliding track 11 in a direction of advance A in a bi-directional manner (FIG. 3).

The mobile slider 12 is moved along the sliding track 11 by motor means.

In the embodiment example shown, the transport system 10 comprises a linear motor 13 comprising primary coils 13a (FIGS. 6 and 7) interacting with permanent magnets 13b (FIGS. 2, 6 and 7) to move the mobile slider 12 on the sliding track 11.

In particular, the linear motor 13 comprises a plurality of primary coils 13a, which are preferably distributed along the sliding track 11 in a uniform manner. The primary coils 13a are disposed in a wall 14 of the sliding track 11, as can be seen in the sections of FIGS. 6 and 7.

Furthermore, the linear motor 13 comprises at least one permanent magnet 13b, operatively associated with the mobile slider 12, in particular housed in a cavity 15 of the slider (FIGS. 2, 6 and 7). Preferably, the shape of the cavity 15 is mating with the shape of the permanent magnet 13b.

In some variants of the transport system 10 in which a plurality of mobile sliders 12 are provided, all of which sliding on the sliding track 11, the transport system 10 consequently comprises a plurality of permanent magnets 13b, each associated with a respective mobile slider 12.

In any case, the movement of the mobile sliders 12 is achieved, according to modes well known in the state of the art, by selectively activating, according to a sequential progression, the primary coils 13a. The electromagnetic field that is generated determines a movement of the mobile slider 12, thanks to the interaction of the electromagnetic field with the permanent magnet 13b on board the slider.

Although hereafter we will refer only to the use of linear motors, what described can also be applied to other types of transport systems, such as chain, belt, etc. conveyors of the indexed type, in which the mobile sliders are moved step-wise.

The transport system 10 comprises a first rolling guide 16 and a second rolling guide 17, which develop along the sliding path, distanced from each other and configured to allow the movement of the mobile sliders 12 on the sliding track 11. To this end, each mobile slider 12 comprises a first rolling unit 18 and a second rolling unit 19 cooperating respectively with the first and the second rolling guides 16, 17, with modes that will be described in greater detail below.

In the embodiment shown in FIG. 1, the first rolling guide 16 is disposed adjacent to a lower side of the sliding track 11 and the second rolling guide 17 is disposed adjacent to an upper side of the sliding track 11, so that the sliding track 11 is interposed between the rolling guides 16, 17.

Each rolling guide 16, 17 comprises respective rectilinear portions, indicated with reference numbers 16a, 17a, and respective curved portions, indicated with reference numbers 16b, 17b.

The passage from one respective rectilinear portion 16a, 17a to one respective curved portion 16b, 17b occurs in correspondence with a respective transition zone, indicated with the numerical reference 16c, 17c (FIG. 3), to which we will also refer hereafter with the terms "first transition zone 16c" and "second transition zone 17c".

Furthermore, each rolling guide 16, 17 comprises a pair of cams, each having a respective rolling surface.

For the sake of clarity only, hereafter we will refer to the pair of cams comprised in the first rolling guide 16 with the expressions "first cam" and "second cam", indicated respectively with reference numbers 20 and 21, while we will refer to the pair of cams comprised in the second rolling guide 17 with the expressions "third cam" and "fourth cam", indicated respectively with reference numbers 22 and 23. In a similar way, the first cam 20 comprises a first rolling surface 20a, the second cam 21 comprises a second rolling surface 21a, the third cam 22 comprises a third rolling surface 22a and the fourth cam 23 comprises a fourth rolling surface 23a.

Preferably, the first cam 20 is adjacent to the second cam 21 and the third cam 22 is adjacent to the fourth cam 23.

In the embodiments shown in the attached drawings, the first and third cams 20, 22 are disposed more external and the second 21 and the fourth cam 23 are disposed more internal, with the sliding track 11 interposed between the rolling guides 16, 17.

The rolling surfaces 20a, 21a, 22a, 23a of the cams 20, 21, 22, 23 have a respective width that is constant along the entire sliding path and are disposed at respective rolling heights with respect to the sliding track. These rolling widths and heights are indicated with numerical references L1, L2, L3 and L4 and H1, H2, H3 and H4 respectively, in order, for the first, second, third and fourth rolling surface 20a, 21a, 22a, 23a (see in particular FIG. 6).

The rolling heights H1, H2, H3 and H4 are measured as a distance from a respective fixed reference surface, each surface being disposed so as to be facing the respective rolling surfaces 20a, 21a, 22a, 23a along the entire sliding path and on which lies a common reference line located parallel to the sliding path.

In the example shown, the distance between the rolling surfaces 20a, 21a, 22a, 23a of the cams 20, 21, 22, 23 and the sliding track is measured with respect to the wall 14 of the sliding track.

Figure 4:
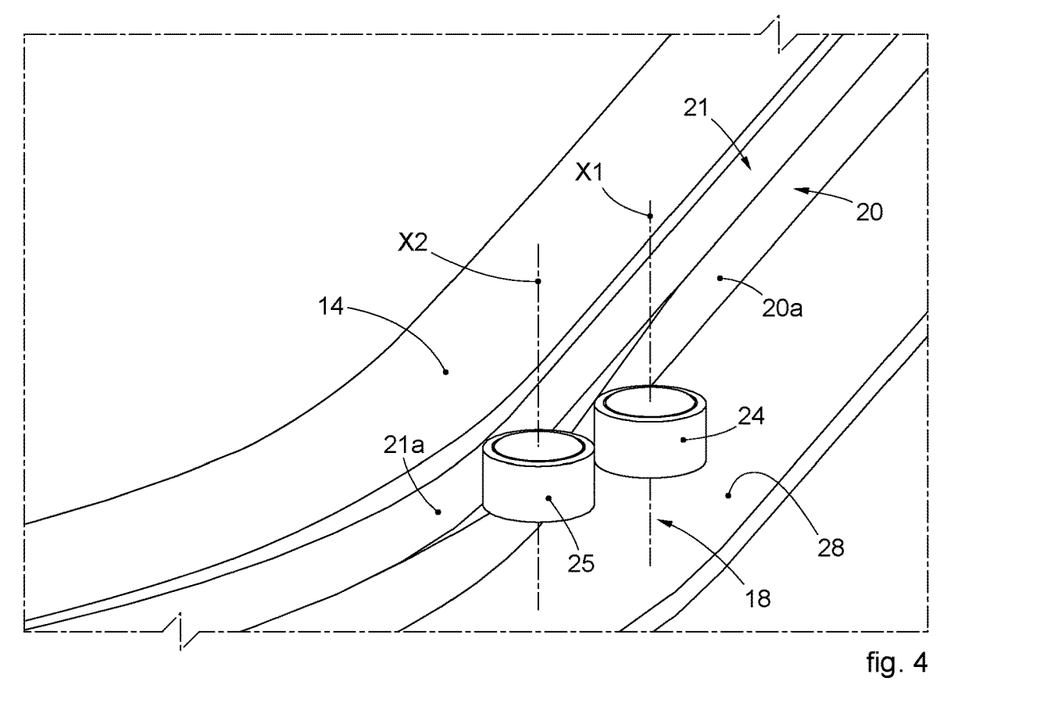
FIGS. 4 and 5 are schematic and simplified perspective views of the enlarged details of FIGS. 3a and 3b respectively.
Figure 5:
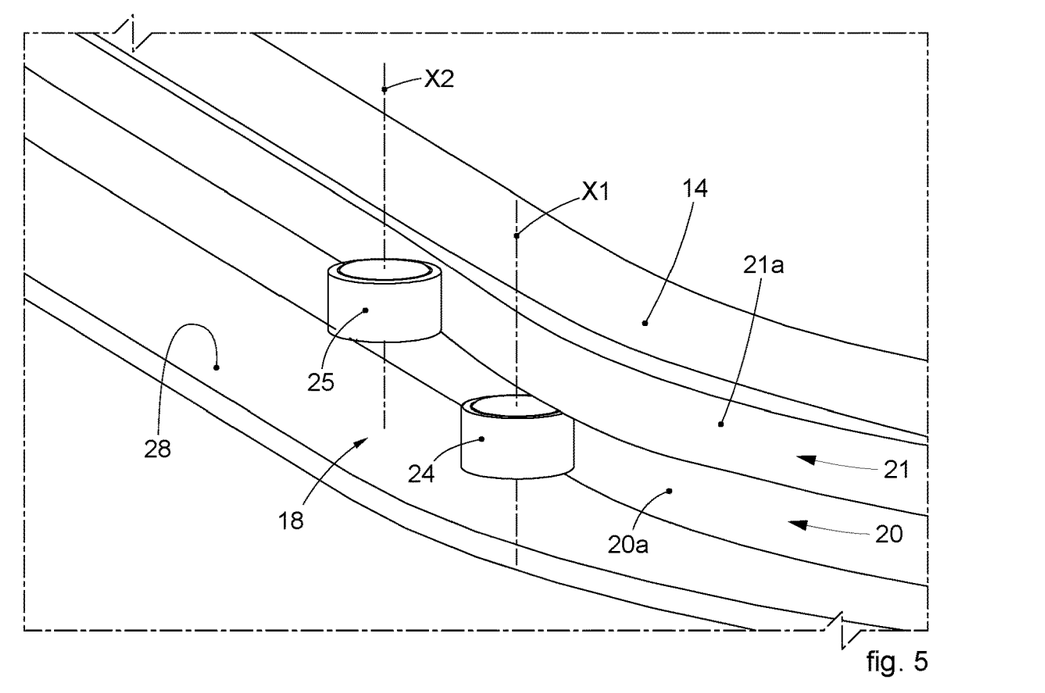

The first rolling unit 18 of the mobile slider 12 comprises a first and a second rolling element 24, 25, configured respectively to roll over the first and second rolling surface 20a, 21a around a respective first and second rolling axis, indicated with references X1 and X2 (FIGS. 4 and 5).

Similarly, the second rolling unit 19 of the mobile slider 12 comprises a third and fourth rolling element 26, 27 configured respectively to roll over the third and fourth rolling surface 22a, 23a, around a respective third and fourth rolling axis, indicated with references X3 and X4 (FIGS. 2, 6 and 7).

In the embodiment shown, the first, second, third and fourth rolling elements 24, 25, 26, 27 are casters, but it is quite clear that they can be configured as any rolling element whatsoever able to roll, such as for example wheels, rolls, small rolls, of a known type or to be developed in the future.

The size of the width of the respective rolling surfaces 20a, 21a, 22a, 23a is sized and conformed as a function of the size and shape of the respective rolling elements 24, 25, 26, 27 that have to roll over them.

The rolling heights H1, H2, H3 and H4 of the first, second, third and fourth rolling surfaces 20a, 21a, 22a, 23a are constant both along the rectilinear portions 16a, 17a and also along the curved portions 16b, 17b of the sliding path, while they are variable, according to the modalities that will be described below, in the transition zone 16c, 17c.

In particular, the difference, in absolute value, between the value of the first and second rolling heights H1, H2, which have to be measured at an identical point of the sliding path, defines a cam profile offset S (FIG. 3), better visible in the enlargements of FIGS. 3a and 3b, which will be described in greater detail below.

Hereafter in the present description, each time we refer to the cam profile offset S, it is to be understood as measured with the heights of the two cams of the same rolling guide taken at the same point.

In a completely similar manner, the difference, in absolute value, between the value of the third and fourth rolling heights H3, H4, measured at an identical point of the sliding path, also defines the cam profile offset S as above.

The first and second rolling heights H1, H2, as well as the third and fourth rolling heights H3, H4, are disposed so that the cam profile offset S has values that vary, in particular point by point, only when measured in the respective transition zone 16c, 17c.

Consequently, the first and second rolling surfaces 20a, 21a have a different curvilinear profile from each other in the first transition zone 16c. Similarly, the third and fourth rolling surfaces 22a, 23a also have a different curvilinear profile from each other in the second transition zone 17c.

Preferably, the first and third rolling surfaces 20a, 22a are parallel to each other along the entire sliding path, and—similarly—the second and fourth rolling surfaces 21a, 23a are also parallel to each other along the entire sliding path. In other words, the third rolling height H3 is the same as the first rolling height H1 along the entire sliding path, and—similarly—the fourth rolling height H4 is the same as the second rolling height H2 along the entire sliding path.

Therefore, the first and third rolling surfaces 20a, 22a, and in turn the second and fourth rolling surfaces 21a, 23a, have a respective identical profile to each other along the entire sliding path.

FIGS. 3a and 3b show an enlargement of FIG. 3, in which it is possible to see the interaction between the first rolling unit 18 of the mobile slider 12, schematized with a dashed rectangle in these drawings, and the first rolling guide 16. In accordance with the geometric configuration of the transport system previously described, the interaction between the second rolling unit 19 of the mobile slider 12 and the second rolling guide 17 is completely identical to that shown in FIGS. 3, 3a and 3b, and is therefore omitted.

It should be noted that in the enlargements of FIGS. 3a and 3b the rolling heights H1 and H2, and therefore also the cam profile offset S, have been significantly exaggerated for the benefit of descriptive clarity, therefore the curved profile of the rolling surfaces 20a and 21a in the first transition zone 16c has to be considered purely as indicative.

The choice of having different cam profiles in the transition zone is due to the fact that in this way, with reference only to the first rolling guide, two rails are created (the first and second rolling surfaces) with different profiles for the first and second rolling elements of the slider.

With particular reference to FIG. 3a, in the first transition zone 16c from the rectilinear portion 16a to the curved portion 16b, the first rolling height H1 varies and is greater than the second rolling height H2, since the first rolling surface 20a protrudes, with reference to the wall 14, by a greater amount than the amount by which the second rolling surface 21a protrudes, with reference to the same wall 14. As stated, the difference in absolute value between the two heights H1 and H2 determines the cam profile offset S, which—in the first transition zone 16c—varies locally, that is, point by point.

In practice, in the first transition zone 16c, the radius of curvature (not constant) of the first rolling surface 20a is, point by point, smaller than the radius of curvature (not constant) of the second rolling surface 21a.

Furthermore, with reference to FIG. 3a, the value of the first rolling height H1 along the first transition zone 16c has values greater than the constant value of the first rolling height H1 in the rectilinear 16a and curved 16b portions, while the values of the second rolling height H2, always along the first transition zone 16c of FIG. 3a, are preferably smaller than the constant value of the second rolling height H2 in the rectilinear 16a and curved 16b portions. In practice, the variation of the cam profile offset S in the first transition zone 16c is due to a concomitant variation of the values of the first rolling height H1 (greater radii of curvature) and of the second rolling height H2 (smaller radii of curvature).

With reference to FIG. 3b, in the first transition zone 16c, unlike the other first transition zone 16c shown in FIG. 3a, the second rolling height H2 varies and is greater than the first rolling height H1, since the second rolling surface 21a protrudes, with reference to the wall 14 of the sliding track 11, by a greater amount than the amount by which the first rolling surface 20a protrudes, with reference to the same wall. Also in this case, the difference in absolute value between the two heights H1 and H2 determines the cam profile offset S, which—in the first transition zone 16c—is variable point by point.

Furthermore, with reference to FIG. 3b, the values of the second rolling height H2 along the first transition zone 16c are greater than the constant value of the second rolling height H2 in the rectilinear 16a and curved 16b portions, while the values of the first rolling height H1, always in the first transition zone 16c of FIG. 3b, are preferably smaller than the constant value of the first rolling height H1 in the rectilinear 16a and curved 16b portions. In practice, the variation of the cam profile offset S in the first transition zone 16c of FIG. 3b is due to a concomitant variation of the values of the second rolling height H2 (greater radii of curvature) and of the first rolling height H1 (smaller radii of curvature).

In accordance with the configuration just described, for each curved portion 16b there is a pair of transition zones 16c, wherein each transition zone 16c is located on the sides of the curved portion 16b so as to connect the curved portion 16b to the rectilinear portions 11a at entry and at exit from the curved portion 16b. The trend of the cam profile offset S in these two transition zones 16c is variable and is specular with reference to the curved portion 16b, as clearly visible in FIG. 3.

Specifically, the cam whose rolling height values along the transition zone are greater than its rolling height value along the respective rectilinear and curved portions, forms a hump or arched profile, the top of which faces the direction opposite that of the sliding track, in the transition zone 16c; while the other cam, belonging to the same rolling guide, in correspondence with said hump, has a slight recess toward the sliding track, that is, in the opposite direction to the hump.

In other words, on one side of the curved portion 16b the transition zone 16c has the first cam 20 with the hump and the second cam 21 with the recess, and, in a specular manner, on the other side of the same curved proportion 16b the other transition zone 16c has the first cam 20 with the recess and the second cam 21 with the hump.

The reason for this specular configuration just described lies in the fact that, in this way, the rolling element of the slider that during the sliding of the mobile slider 12 on the sliding track 11 is located further away from the curved portion 16b (therefore closer to the rectilinear portion 16a) than the other rolling element, travels along the cam that has a profile with the hump, that is, it distances itself with respect to the sliding track, while the rolling element of the mobile slider 12 that during the sliding of the slider on the sliding track is located closer to the curved portion 16b (therefore further away from the rectilinear portion 16a) than the other rolling element, travels along the cam that has a profile with the recess.

It should be noted that the transport system 10 according to the present invention provides that in the first rectilinear portions 16a and in the first curved portions 16b, the cam profile offset S between the first and second rolling surfaces 20a, 21a of the first and second cams 20, 21 is constant. Similarly, it is provided that in the second rectilinear 17a and curved 17b portions, the cam profile offset S is also constant between the third and fourth rolling surfaces 22a, 23a of the third and fourth cams 22, 23. In other words, the first and the second cams 20, 21, as well as the third and fourth cams 22, 23, are configured and disposed so that both the first and second rolling heights H1, H2, and respectively the third and fourth rolling heights H3, H4, are invariable along the rectilinear portions 16a and 17a and along the curved portions 16b and 17b. In this way, the cam profile offset S is constant both in the rectilinear portions 16a, 17a and also in the curved portions 16b, 17b, while at least one of either the first or second rolling height H1, H2 and consequently at least one of either the third or fourth rolling height H3, H4 has a variable value along the respective transition zones 16c, 17c, and also the cam profile offset S has a variable value along said transition zones.

In the example shown, the rolling height H1, H3 of the first and third rolling surface 20a, 21a of the rectilinear portion 16a, 17a is equal to that of the curved portion 16b, 17b, and also the rolling height H2, H4 of the second and fourth rolling surface 22a, 23a of the rectilinear portion 16a, 17a is equal to that of the curved portion 16b, 17b. Preferably, along the first curved portion 16b (FIG. 3), the first rolling height H1 is equal to the second rolling height H2, since the first rolling surface 20a protrudes, with reference to the wall 14 of the sliding track 11, by an amount identical to the amount by which the second rolling surface 21a protrudes, with reference to the same wall 14. In this case, the difference in absolute value between the two heights H1 and H2, which determines the cam profile offset S, is constant in the first curved portion 16b, that is, it does not vary moving along the first curved portion 16b and is equal to zero.

According to one specific embodiment, in the rectilinear portions 16a, 17a and in the curved portions 16b, 17b of the rolling guides 16, 17, the rolling heights H1, H2, H3 and H4 of the first, second, third and fourth rolling surfaces 20a, 21a, 22a, 23a are equal to each other.

With reference to the mobile slider 12, according to a preferred embodiment, shown in the attached drawings, the first and second rolling axes X1 and X2 respectively of the first and second rolling elements 24, 25 are not coincident with each other and are distanced in the direction of advance A. Preferably, the first and second rolling axes X1, X2 are substantially parallel to each other. Similarly, the third and fourth rolling axes X3 and X4 are not coincident with each other and are distanced in the direction of advance A. Preferably, the third and fourth rolling axes X3, X4 are substantially parallel to each other.

Consequently, the third and fourth rolling axes X3, X4 are parallel to at least one of either the first or the second rolling axis X1, X2, more preferably to both. In this specific case, shown in the attached drawings, all four rolling axes X1-X4 of the rolling elements 24, 25, 26 and 27 are parallel to each other.

In a preferred embodiment, the first and third rolling axes X1 and X3 are coincident, meaning with this term that they are longitudinally aligned with each other so as to be disposed on a single straight line, in particular vertical, as clearly visible in FIG. 2.

Similarly, the second and fourth rolling axes X2 and X4 are also coincident, according to the previous definition, both being disposed on a single directrix, defined by another straight line, vertical and parallel to the straight line as above on which the first and the third rolling axes X1 and X3 are disposed (FIG. 2).

Preferably, all rolling axes X1, X2, X3 and X4 are disposed perpendicular with respect to the direction of advance A.

In other words, the geometric disposition of the rolling elements 24, 25, 26 and 27 causes a center distance I (FIG. 2) between the pair of rolling elements 24, 25 comprised in the first rolling unit 18, to be equal to a center distance I between the pair of rolling elements 26, 27 comprised in the second rolling unit 19, as shown in FIG. 2. These center distances are defined as the distances between the rolling axes X1-X2 and X3-X4 of the rolling elements 24-25 and 26-27.

The value of the cam profile offset S in the transition zone 16c, 17c is proportional to the center distance I, therefore as the center distance I increases, there will be a greater cam profile offset S value as well as a greater length of the transition zone.

Advantageously, the transport system 10 according to the present invention allows to dispose the rolling elements 24, 25, 26 and 27 in such a way as to define center distances I that can reach values of approximately 100 mm with diameters of the rolling elements 24, 25, 26 and 27 of approximately 25 mm, reaching values that are even three or four times the center distances that usually characterize the distances of mobile sliders of this type known in the state of the art. Therefore, in accordance with the teachings of the present invention, the sizes of the mobile slider 12 are much larger, and it is thus equipped with a significantly greater load capacity than that of sliders of the type known in the state of the art.

It should be noted that, when the mobile slider 12 travels along the transition zones 16c, 17c, the first and second rolling axes X1, X2, as well as the third and fourth rolling axes X3, X4, are configured to be disposed respectively at a first and a second reference height with respect to the sliding track 11, and in particular with respect to the wall 14, as can be better seen in the enlargements of FIGS. 3a and 3b, where such reference heights are disposed along the trajectory represented with a dash-dot line. The first and the second reference heights are variable along the sliding path, in the first transition zones 16c, so that the difference between the first and the second reference height, in absolute value, measured at an identical point of the sliding path, defines a forward inclination value of the mobile slider 12. In the enlargements of FIGS. 3a and 3b, where the mobile slider 12 is represented schematically with a dashed rectangle, its relative disposition with respect to the sliding track 11 shows very clearly the forward inclination as above.

According to one variant, not shown, the transport system 10 according to the present invention can comprise only the first rolling guide 16, since it does not have the second rolling guide 17. Consequently, according to this variant, the transport system comprises only the first rolling unit 18, since it does not have the second rolling unit 19. It is quite clear that other variants, completely technically equivalent to the one just described, provide that the transport system 10 comprises only the second rolling guide 17 and the second rolling unit 19, but does not have the first rolling guide 16 and the first rolling unit 18. In other words, some variants of the present invention provide that the transport system 10 comprises only one rolling guide, either the one adjacent to the lower side of the sliding track 11, or the one adjacent to the upper side of the sliding track 11, and consequently only the respective rolling unit 18 or 19 able to roll on the guide as above.

The transport system 10 according to the present invention also comprises a pair of support planes 28, 29 disposed opposite each other, with the sliding track 11 interposed between them.

The mobile slider 12 also comprises at least one encoder arm 30 configured to cooperate with the sliding track 11 in order to determine the position of the mobile slider 12, as shown in FIGS. 1 and 7.

The mobile slider 12 also comprises a plurality of support rolling elements, configured for example as wheels, casters, rolls or small rolls, and cooperating with at least one, or more preferably two, of the support planes 28, 29. As shown in FIG. 2, the support rolling elements are configured as wheels, indicated with reference number 31, each one rotatable around a respective axis, oriented horizontally, wherein each support wheel is disposed in the proximity of a respective rolling element 24, 25, 26, 27. In particular, one pair of support wheels is configured to cooperate rolling with the support plane 28 adjacent to the lower side of the sliding track 11, and another pair of support wheels is configured to cooperate rolling with the other support plane, indicated with reference number 29, and adjacent to the upper side of the sliding track 11.

According to some variants, the transport system 10 provides that the rolling heights H1 and H2, as well as H3 and H4, are different from each other also in the rectilinear portions 16a, 17a and in the curved portions 16b, 17b, always maintaining the cam profile offset S constant. In this case, in order to guarantee the correct sliding of the mobile slider 12, the different rolling elements 24, 25, 26 and 27 can have different diameters from each other, suitably correlated to the profile of the respective rolling surfaces 20a, 21a, 22a, 23a on which they roll. As an alternative to, or in combination with, this variant the different rolling elements 24, 25, 26 and 27 can all have the same diameter but the respective rolling axes X1, X2, X3 and X4 are each disposed at a suitable distance from the sliding track 11, correlated to the profile of the rolling surfaces 20a, 21a, 22a, 23a on which the rolling elements 24, 25, 26 and 27 roll.

It is clear that modifications and/or additions of parts may be made to the transport system 10 as described heretofore, without departing from the field and scope of the present invention as defined by the claims.

It is also clear that, although the present invention has been described with reference to some specific embodiment examples, a person of skill in the art shall certainly be able to achieve many other equivalent forms of transport systems, having the characteristics as set forth in the claims and hence all coming within the field of protection defined thereby. In the following claims, the sole purpose of the references in brackets is to facilitate reading: they must not be considered as restrictive factors with regard to the field of protection claimed in the specific claims.

The invention claimed is:

1. A transport system (10) for transporting products, the system comprising:
    a stationary sliding track (11) extending along a continuous sliding path free of interruptions;
    a mobile unit (12) which can be moved on said sliding track (11) in a direction of advance (A);
    motor means configured so as to move said mobile unit (12) on said sliding track (11);
    a first rolling guide (16) which extends along said sliding path, disposed in the proximity of said sliding track (11) and having at least one first rectilinear portion (16a) and at least one first curved portion (16b);
    wherein said mobile unit (12) comprises at least a first rolling unit (18) configured to cooperate with said first rolling guide (16), wherein said first rolling guide (16) has a first transition zone (16c) interposed between the first rectilinear portion (16a) and the first curved portion (16b) and comprises a first and a second cam (20, 21) having respectively a first and a second rolling surface (20a, 21a), and said first rolling unit (18) comprises a first and a second rolling element (24, 25) configured to roll respectively over said first and second rolling surface (20a, 21a), around respective first and second rolling axes (X1, X2), not coinciding with each other and distanced in said direction of advance (A), said first and second rolling surfaces (20a, 21a) having a respective first and second width (L1, L2) constant along said sliding path and being disposed at a respective first and second rolling height (H1, H2) with respect to said sliding track (11), wherein the difference, in absolute value, between the value of said first and said second rolling heights (H1, H2) measured at an identical point of said sliding path, defines a cam profile offset (S) at the point in which it is measured; and wherein said first and second cams (20, 21) are configured and disposed so that both said first and second rolling heights (H1, H2) are invariable along said at least one first rectilinear portion (16a) and along said at least one first curved portion (16b), so that the cam profile offset (S) is constant both along the first rectilinear portion (16a) and also along the first curved portion (16b), while at least one of either said first or second rolling heights (H1, H2) has a variable value along the first transition zone (16c) and also the cam profile offset (S) has a variable value along the first transition zone (16c).

2. The system (10) as in claim 1, wherein said first and second rolling axes (X1, X2) are parallel to each other and/or perpendicular to said direction of advance (A).

3. The system (10) as in claim 1, further comprising a second rolling guide (17) which develops along said sliding path, distanced from said first rolling guide (16), wherein said second rolling guide (17) has at least one second rectilinear portion (17a) and at least one second curved portion (17b) with a second transition zone (17c) interposed between the second rectilinear portion (17a) and the second curved portion (17b), said second rolling guide (17) comprising at least a third cam (22) having a third rolling surface (22a), and wherein said mobile unit (12) also comprises a second rolling unit (19) comprising a third rolling element (26) configured to roll over said third rolling surface (22a) around a third rolling axis (X3), said third rolling surface (22a) having a third width (L3) constant along said sliding path and being disposed at a third rolling height (H3) with respect to said sliding track (11).

4. The system (10) as in claim 3, wherein said third rolling height (H3) is equal to said first rolling height (H1) along the entire sliding path and optionally said third rolling axis (X3) is parallel to at least one of either said first or second rolling axes (X1, X2).

5. The system (10) as in claim 3, wherein said first and third rolling surfaces (20a, 22a) are parallel to each other along the entire sliding path and optionally said first and third rolling axes (X1, X3) are coincident.

6. The system (10) as in claim 3, wherein said first and third rolling surfaces (20a, 22a) have an identical curvilinear profile in said respective first and second transition zones (16c, 17c).

7. The system (10) as in claim 3, wherein said first rolling guide (16) is disposed adjacent to one side of said sliding track (11) and said second rolling guide (17) is disposed adjacent to another side of said sliding track (11), so that said sliding track (11) is interposed between said first and said second rolling guides (16, 17).

8. The system (10) as in claim 3, wherein said second rolling guide (17) also comprises a fourth cam (23) having a fourth rolling surface (23a), optionally located adjacent to said third cam (22).

9. The system (10) as in claim 8, wherein said second rolling unit (19) also comprises a fourth rolling element (27) configured to roll over said fourth rolling surface (23a) around a fourth rolling axis (X4), said fourth rolling axis (X4) being parallel to at least one of either said first or second rolling axes (X1, X2), wherein said fourth rolling surface (23a) has a fourth width (L4) constant along said sliding path and is disposed at a fourth rolling height (H4) with respect to said sliding track (11), said fourth rolling height (H4) being equal to said second rolling height (H2) along the entire sliding path.

10. The system (10) as in claim 8, wherein said second and fourth rolling surfaces (21a, 23a) are parallel to each other along the entire sliding path and optionally said second and fourth rolling axes (X2, X4) are coincident.

11. The system (10) as in claim 8, wherein said first and third cams (20, 22) are disposed more external and said second and fourth cams (21, 23) are disposed more internal, with said sliding track (11) interposed between said first and said second rolling guides (16, 17).

12. A transport system (10) for transporting products, the system comprising:
    a stationary sliding track (11) extending along a continuous sliding path free of interruptions;
    a mobile unit (12) which is able to be moved on said sliding track (11) in a direction of advance (A);
    motor means configured to move said mobile unit (12) on said sliding track (11);
    a rolling guide (16) which develops along said sliding path, disposed in the proximity of said sliding track (11) and having at least one first rectilinear portion (16a) and at least one first curved portion (16b);

wherein said mobile unit (12) comprises at least one rolling unit (18) configured to cooperate with said rolling guide (16), wherein said rolling guide (16) has a first transition zone (16c) interposed between the first rectilinear portion (16a) and the first curved portion (16b) and comprises a first and a second cam (20, 21) having respectively a first and a second rolling surface (20a, 21a), and said rolling unit (18) comprises a first and a second rolling element (24, 25) configured to roll over said first and second rolling surfaces (20a, 21a) respectively, around respective first and second rolling axes (X1, X2) not coinciding with each other and distanced in said direction of advance (A), wherein said first and second rolling elements (24, 25) are configured to dispose the respective first and second rolling axis (X1, X2) at a first and second reference height with respect to said sliding track (11) when said mobile unit (12) is moved on said sliding track (11) in the direction of advance (A), so that the difference between said first and said second reference heights, measured at an identical point of the sliding path, defines a forward inclination value of said mobile unit (12); and wherein said first and second cams (20, 21) are configured and disposed so that both said first and second reference heights are invariable both along said at least one rectilinear portion (16a) and also along said at least one curved portion (16b), in this way the forward inclination value is constant in the rectilinear portion (16a) and in the curved portion (16b), while at least one of either said first or second reference height has a variable value along the transition zone (16c) and also said forward inclination has a variable value in the transition zone (16c).

13. A transport system (10) for transporting products, the system comprising a stationary sliding track (11), at least one mobile unit (12), the latter comprising at least one rolling unit (18) able to cooperate, in a sliding relation, with said sliding track (11), and motor means configured to drive said mobile unit (12) into movement on said sliding track (11), wherein said sliding track (11) is extended along a continuous sliding path free of interruptions; wherein said transport system (10) also comprises a rolling guide (16) which develops along the sliding path, disposed in the proximity of said sliding track (11), having at least one first rectilinear portion (16a) and at least one first curved portion (16b), and able to cooperate in a rolling relation with said rolling unit (18); wherein said first rolling guide (16) has a first transition zone (16c) interposed between the first rectilinear portion (16a) and the first curved portion (16b), and comprises a first and a second cam (20, 21) having respectively a first and a second rolling surface (20a, 21a) able to be respectively abutted, according to a rolling relation, by a first and a second rolling element (24, 25) comprised in said rolling unit (18), said first and second rolling surfaces (20a, 21a) having a respective first and second width constant along said sliding path and being disposed at a respective first and second rolling height (H1, H2) with respect to said sliding track (11), wherein the difference, in absolute value, between the value of said first rolling height (H1) and said second rolling height (H2), measured at the same point of the sliding path, defines a cam profile offset (S), and wherein said first and second cams (20, 21) are configured and disposed so that both said first and second rolling heights (H1, H2) are invariable both along said at least one rectilinear portion (16a) and also along said at least one curved portion (16b), in this way the cam profile offset (S) is constant in the rectilinear portion (16a) and in the curved portion (16b), while at least one of either said first or second rolling heights (H1, H2) has a value that varies along the transition zone (16c) and also the cam profile offset (S) has a value that varies along the transition zone (16c).

14. The system (10) as in claim 1, wherein said sliding track (11) develops along a closed path and optionally said first and second cams (20, 21) are adjacent to each other.

15. The system (10) as in claim 1, wherein said first and second rolling surfaces (20a, 21a) have a curvilinear profile with radii of curvature different from each other in said first transition zone (16c).

16. The system (10) as in claim 1, wherein said motor means comprise a linear motor (13) comprising primary coils (13a) disposed on a wall (14) of said sliding track (11) and at least one permanent magnet (13b), said at least one permanent magnet (13b) being housed in said mobile unit (12) so as to interact with said primary coils (13a) in order to move said mobile unit (12) on said sliding track (11).

17. The system (10) as in claim 1, wherein, in said transition zone (16c), said first cam (20) has a portion with an arcuate profile protruding with respect to the profile of said second cam (21), or said second cam (21) has a portion with an arcuate profile protruding with respect to the profile of said first cam (20).

* * * * *